UNITED STATES PATENT OFFICE.

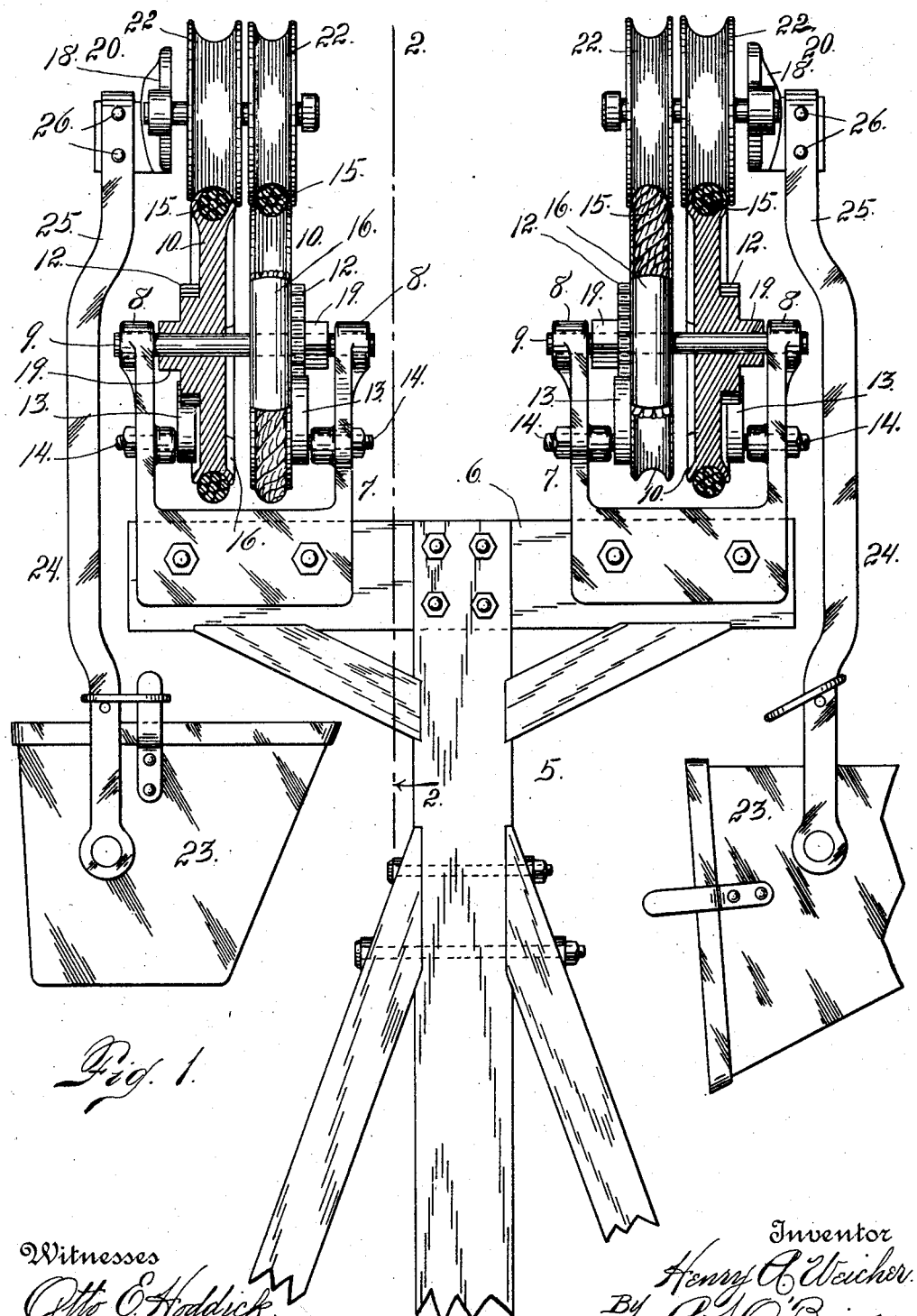

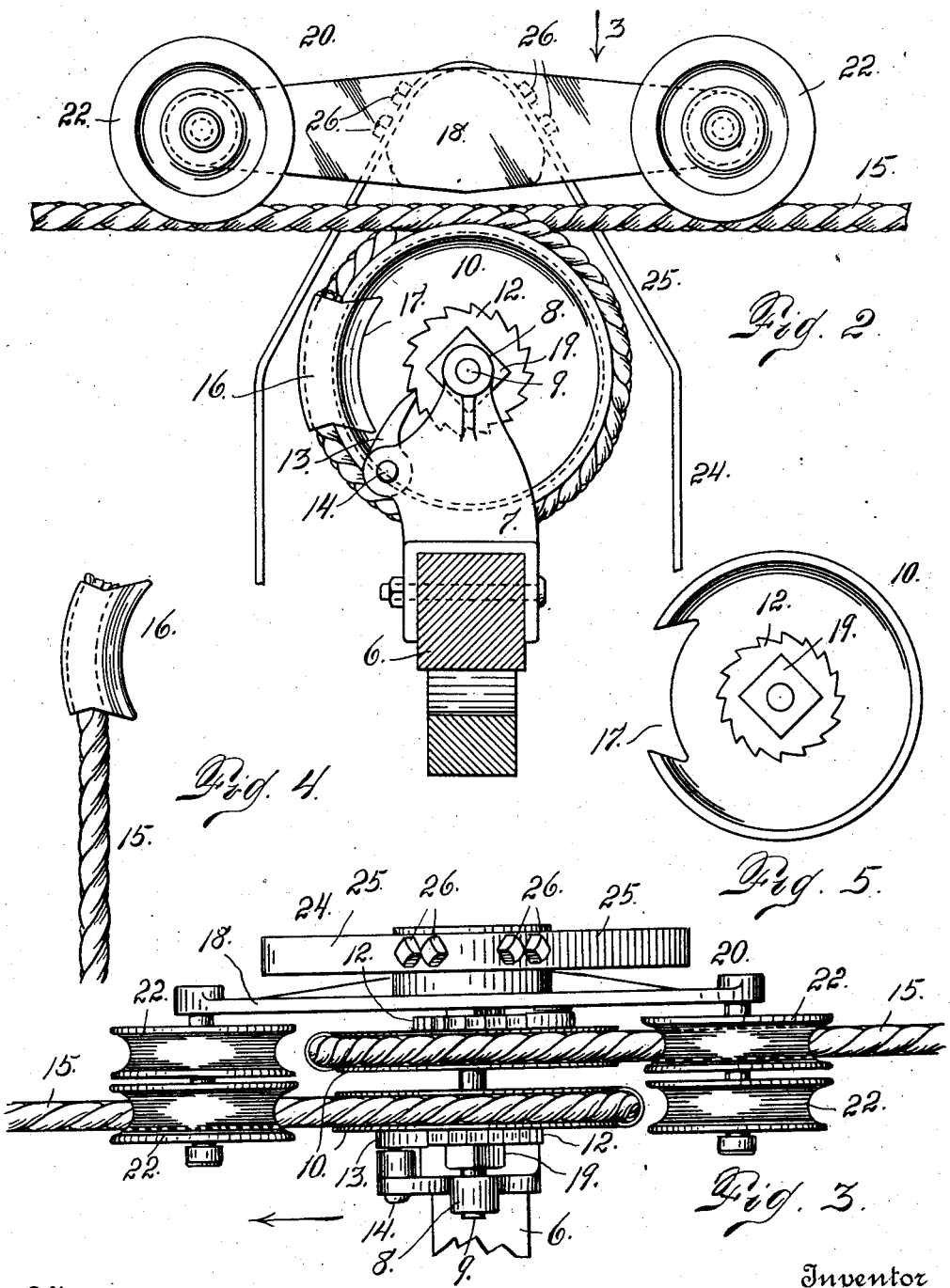

HENRY A. WEICHER, OF DENVER, COLORADO, ASSIGNOR OF ONE-HALF TO JOHN C. REAGAN, OF WHITEPINE, COLORADO.

TIGHTENING AND SUPPORTING MEANS FOR WIRE-ROPE TRAMWAYS.

997,526.  Specification of Letters Patent.  Patented July 11, 1911.

Application filed October 4, 1910. Serial No. 585,241.

*To all whom it may concern:*

Be it known that I, HENRY A. WEICHER, a citizen of the United States, residing in the city and county of Denver and State of Colorado, have invented certain new and useful Improvements in Tightening and Supporting Means for Wire-Rope Tramways; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates generally speaking to improvements in wire rope tramways for transporting ore down mountain sides in sections where other means of transportation are impracticable or so expensive as to be prohibitive.

More specifically, however, the invention relates to means for supporting and tightening the cable, which consists of a series of sections or distinct members, each of which only need be of sufficient length to span the distance between the upright structures which form the support for the cable.

Heretofore so far as I am aware, it has been customary to employ single cables extending the entire length of the line. This is quite expensive both so far as original cost is concerned, as well as future maintenance. In my improved construction it becomes practicable to anchor the free extremities of each cable member at the two adjacent uprights, provision being made for connecting these extremities with tension wheels rotatably mounted and having a ratchet and pawl connection with the framework of the upright, whereby each member may be tightened or drawn taut whenever it shall become too slack for use.

In my improved construction there are two tension anchor wheels located at each upright, the said wheels being arranged side by side and loosely mounted on the same shaft. Hence the two cable members which terminate at each upright are slightly out of alinement. For this reason the bucket-supporting trolley carries double grooved wheels at each extremity of the trolley frame. One of these wheels at each end is idle between the uprights and they are both in engagement with the cable only while passing the anchoring wheels. The double pulley members of the trolley, alternately engage the cable members between the uprights, thus giving the two sets of trolley wheels approximately the same degree of wear.

Having briefly outlined my improved construction, I will proceed to describe the same in detail, reference being made to the accompanying drawing in which is illustrated an embodiment thereof.

In this drawing: Figure 1 is an end elevation of a cable-supporting upright equipped with the cable anchoring tension wheels, the mechanism being shown partly in section. Fig. 2 is a section taken on the line 2—2 Fig. 1 looking toward the left. Fig. 3 is a top plan view of the structure shown in Fig. 2 or a view looking in the direction of arrow 3 Fig. 2. Fig. 4 is a detail view illustrating the extremity of a cable member equipped with a segmental anchor clip adapted to enter a recess formed in one of the anchoring tension wheels. Fig. 5 is a side elevation in detail illustrating one of the anchor wheels.

The same reference characters indicate the same parts in all the views.

Let the numeral 5 designate the upright structure constituting the tramway supporting frame. These uprights are suitably spaced or located at desired intervals along the line of the tramway. As illustrated in the drawing a double line is shown and the top of the structure 5 is provided with a cross arm 6 upon each end of which is mounted a frame 7 equipped with bearings 8 for a shaft 9 upon which two anchor wheels 10 are loosely mounted and arranged side by side. Upon each of these wheels is formed an integral ratchet disk 12 adapted to engage a pawl 13 pivoted on a spindle 14 carried by the frame 7. As each anchor wheel 10 is independently adjustable upon the shaft 9, each of these wheels has its individual ratchet 12 and pawl 13, the structures of the two members being substantially identical.

To each wheel 10 of each pair of wheels mounted on the same shaft 9, is attached the extremity of a cable member 15, one of said members extending in one direction and the other in the opposite direction. To the extremity of each cable member is secured a segmental clip 16 adapted to fit into a counterpart recess 17 formed in the anchor wheel 10. This clip after being attached to the extremity of the cable, is slipped laterally into place and the groove in the anchor wheel is of sufficient depth to prevent its escape after the cable member has been drawn sufficiently taut for operating purposes.

Attention is called to the fact that where the line is composed of a number of relatively short cable members, much better opportunity is given for maintaining the cable line sufficiently taut for operating purposes than in the construction heretofore in vogue.

Extending from the ratchet disk 12 of each anchor wheel is a hub 19 formed polygonal in cross section, whereby it is adapted to receive a wrench for the purpose of turning the anchor wheel to tighten the cable either when the structure is originally installed or after the cable member has become slack by use.

As the two anchor wheels 10 are arranged side by side on the same shaft (see Fig. 3), it is necessary that the adjacent cable members shall be out of alinement. This necessitates that the trolley device 20, which ordinarily has a single wheel only at each extremity of the bar 18, shall have two wheels 22 at each end of said bar, in order that one set of alined wheels 22 shall always be in position to engage an adjacent cable member as soon as a trolley has passed a supporting upright.

From the foregoing description it will be understood that when the tramway is originally installed, the extremities of each cable member are respectively connected with the alined anchor wheels 10 of two adjacent supporting uprights. A wrench is then applied to the polygonal hub 19 and the anchor wheel turned sufficiently to give the cable member the required tension. It will be understood that it is not necessary to tension the cable member from one end of the latter alone, since both extremities are connected with anchor wheels, whereby it becomes practicable to tighten the cable member from both extremities if desired.

As illustrated in the drawing each ore bucket 23 is trunnioned on a bail 24 whose upper extremity is arched as shown at 25 and secured to the center of the trolley bar 18 by bolts 26.

Having thus described my invention, what I claim is:

1. A wire rope tramway composed of a number of distinct cable members, the adjacent extremities of any two members being out of alinement and adjustably anchored, for the purpose set forth.

2. A wire rope tramway composed of a number of distinct cable members, upright supports, tightening devices mounted upon each support having the adjacent extremities of the respective cable members terminating at the upright, and suitable means for connecting the extremities of the cable members with said tightening devices, substantially as described.

3. In a wire rope tramway, the combination with a supporting upright, of distinct anchor wheels arranged out of alinement on said upright and rotatably mounted for tightening purposes, cable members whose extremities are respectively connected with the said anchor wheels, and a ratchet and pawl connection between the anchor wheels and the framework of the upright, substantially as described.

4. In wire rope tramway construction, the combination with a supporting upright, of two anchor wheels rotatably mounted on the upright and independently adjustable, distinct cable members whose extremities are respectively connected with the anchor wheels, and means for locking the anchor wheels in the desired position of adjustment after tightening the cable members, substantially as described.

5. A wire rope tramway composed of uprights located at suitable intervals, distinct cable members whose extremities are adjustably connected with the uprights but out of alinement, and a bucket-carrying trolley having wheels arranged to alternately engage the non-alined cable members, substantially as described.

6. In wire rope tramway construction, the combination with a supporting upright, of anchor wheels rotatably mounted on the upright but out of alinement with each other, and distinct cable members whose extremities are suitably connected with the peripheries of the anchor wheels, substantially as described.

7. In wire rope tramway construction, the combination of an anchor wheel having a recess formed in its peripheral portion, a cable member and a clip applied thereto and adapted to enter the recess in the anchor wheel to allow the cable beyond the clip to engage the periphery of the wheel, which is grooved for the purpose.

8. In wire rope tramway construction, the combination of an anchor wheel having a recess formed in its peripheral portion, the extremities of the recess being undercut, and a cable-anchoring clip of counterpart shape adapted to enter the recess of the anchor wheel from the side, the periphery of the wheel being grooved to receive the cable, substantially as described.

In testimony whereof I affix my signature in presence of two witnesses.

HENRY A. WEICHER.

Witnesses:
F. E. BOWEN,
A. EBERT O'BRIEN.

Copies of this patent may be obtained for five cents each, by addressing the "Commissioner of Patents, Washington, D. C."